(12) United States Patent
Bright et al.

(10) Patent No.: US 7,073,317 B2
(45) Date of Patent: Jul. 11, 2006

(54) DE-THATCHER

(75) Inventors: John William Bright, Sullivan, IL (US); Ronald J. Hickenbottom, Sullivan, IL (US)

(73) Assignee: Agri-Fab Inc., Sullivan, IL (US)

( * ) Notice: Subject to any disclaimer, the term of this patent is extended or adjusted under 35 U.S.C. 154(b) by 0 days.

(21) Appl. No.: 11/000,643

(22) Filed: Dec. 1, 2004

(65) Prior Publication Data

US 2006/0123765 A1 Jun. 15, 2006

(51) Int. Cl.
*A01D 76/00* (2006.01)
*A01D 78/00* (2006.01)
*A01D 80/00* (2006.01)
*A01D 84/00* (2006.01)

(52) U.S. Cl. ....................................... 56/400
(58) Field of Classification Search ................. 56/400, 56/130, 127, 364; D15/28; 460/128
See application file for complete search history.

(56) References Cited

U.S. PATENT DOCUMENTS

| | | | | |
|---|---|---|---|---|
| 2,351,144 A | * | 6/1944 | Oehler | 56/364 |
| 2,432,653 A | * | 12/1947 | Bloom | 56/400 |
| 2,581,481 A | | 1/1952 | Hartman et al. | |
| 2,764,163 A | | 9/1956 | Thys | |
| 2,881,580 A | * | 4/1959 | Ashton | 56/364 |
| 2,953,830 A | * | 9/1960 | MacRae | 56/400 |
| 3,099,347 A | | 7/1963 | Dahlquist | |
| 3,318,086 A | | 5/1967 | Whitaker et al. | |
| 3,479,807 A | * | 11/1969 | Tiura | 56/400 |
| 3,512,345 A | * | 5/1970 | Smith | 56/16.9 |
| 3,859,777 A | | 1/1975 | Doering | |
| 3,904,026 A | | 9/1975 | Hofer | |
| D243,945 S | * | 4/1977 | Diehl | D15/28 |
| 4,232,831 A | * | 11/1980 | van der Lely | 239/673 |
| RE32,551 E | | 12/1987 | Doering | |
| 4,805,592 A | | 2/1989 | Enami | |
| 5,042,243 A | | 8/1991 | Doering | |

* cited by examiner

*Primary Examiner*—Árpád Fábián Kovács
(74) *Attorney, Agent, or Firm*—Vedder Price Kaufman & Kammholz

(57) ABSTRACT

A de-thatcher including a tine shield having a mounting portion with a plurality of tine mounting assemblies formed therein. Each tine mounting assembly includes a pair of separately formed tabs and an aperture. Each tab includes a projecting portion and a covering portion to define a pocket. A tine is operatively coupled to each of the tine mounting assemblies and includes a pair of arms extending from opposite sides of a backbone so that each arm engages one of the pockets and is secured therein when the covering portion of tabs is moved from a first operative position to a second operative position.

9 Claims, 6 Drawing Sheets

DE-THATCHER

The present disclosure is directed to de-thatchers, and more particularly, to a tine de-thatcher having an improved tine mounting configuration.

Presently available tine de-thatchers suggest an arrangement for mounting tines or similar articles on a support in one of two ways. Initially, the tines were connected to a mounting plate or tray with a bolt and nut. More recently, arrangements have been suggested for mounting the tines to the mounting plate or tray without any fasteners. Obviously, the use of fasteners to secure the tines increases the complexity and time to manufacture. As a result, the cost to produce the thatchers in such manner was high. Accordingly, de-thatchers were designed which did not require fasteners to secure the tines to the mounting plate or tray. Such attachment means included punching a receptacle in the mounting plate or tray and further forming a deflectable finger in the punched portion of the receptacle. The tine is fitted into the receptacle and the finger is deflected to prevent disengagement of the tine from the receptacle. This arrangement is disadvantageous in that the tine is not secured to the mounting plate or tray. As a result, this loose connection causes a rattle in use which gives the customer an impression of poor quality. Additionally, the production tools necessary to manufacture such arrangement are not durable because of the way it must be designed. This leads to increased down time and higher production costs.

Therefore, there exists a need in the art for a de-thatcher tine mounting configuration that permits a stronger attachment of the tines to the mounting plate or tray and a more durable production tool which decreases costs to manufacturer.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
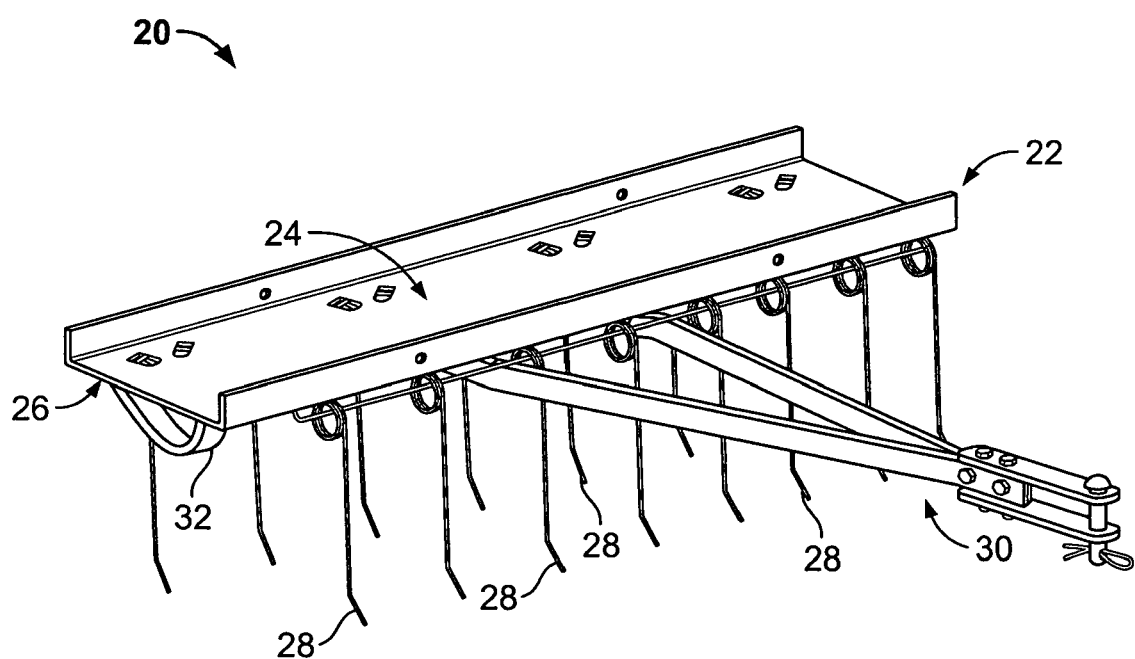
FIG. 1 illustrates a perspective view of a tine de-thatcher.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

In accordance with one principle aspect to the present disclosure, a de-thatcher includes a tine shield having a mounting portion with a plurality of tine mounting assemblies formed therein. Each tine mounting assembly includes a pair of separately formed tabs and an aperture. Each tab includes a projecting portion and a covering portion to define a pocket. A tine is operatively coupled to each of the tine mounting assemblies and includes a pair of arms extending from opposite sides of a backbone so that each arm engages one of the pockets and is secured therein when the covering portion of tabs is moved from a first operative position to a second operative position.

FIG. 1 illustrates a perspective view of a de-thatcher 20 including a tine shield 22 having a mounting portion 24 with a mounting surface 26. A plurality of tines 28 are operatively coupled to the tine shield 22 as it will be described in more detail below. A hitch assembly 30 is connected to the tine shield 22 to facilitate connection with a land vehicle (not shown) so that the de-thatcher 20 may be used as intended. A pair of skid gages 32 are connected to the tine shield 22 to adjust the proper engagement force between the tines 28 and the ground to be de-thatched.

Figure 2:
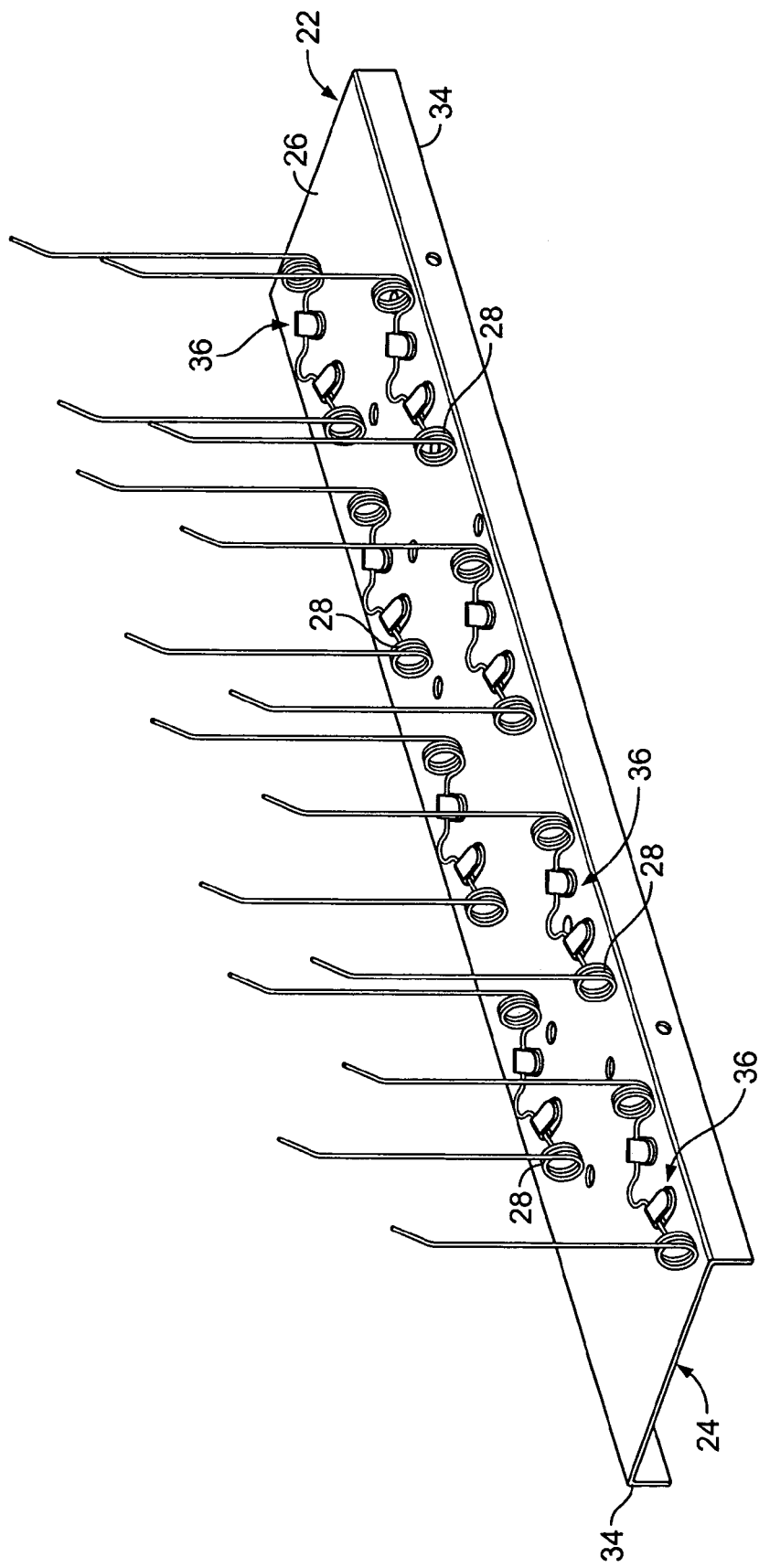
FIG. 2 illustrates a bottom perspective view of a mounting plate of the tine de-thatcher of FIG. 1 where the hitch mount assembly and skid gages have been removed for clarity.

FIG. 2 illustrates a bottom perspective view of the tine shield 22 where the hitch assembly and skid gages have been removed for clarity. The mounting portion 24 is centrally disposed between a pair of longitudinally extending upright sidewalls 34. The mounting surface 26 maybe generally characterized as the lower surface of the mounting portion 24. A plurality of tine mounting assemblies 36 are formed in the mounting portion 24.

Figure 3:
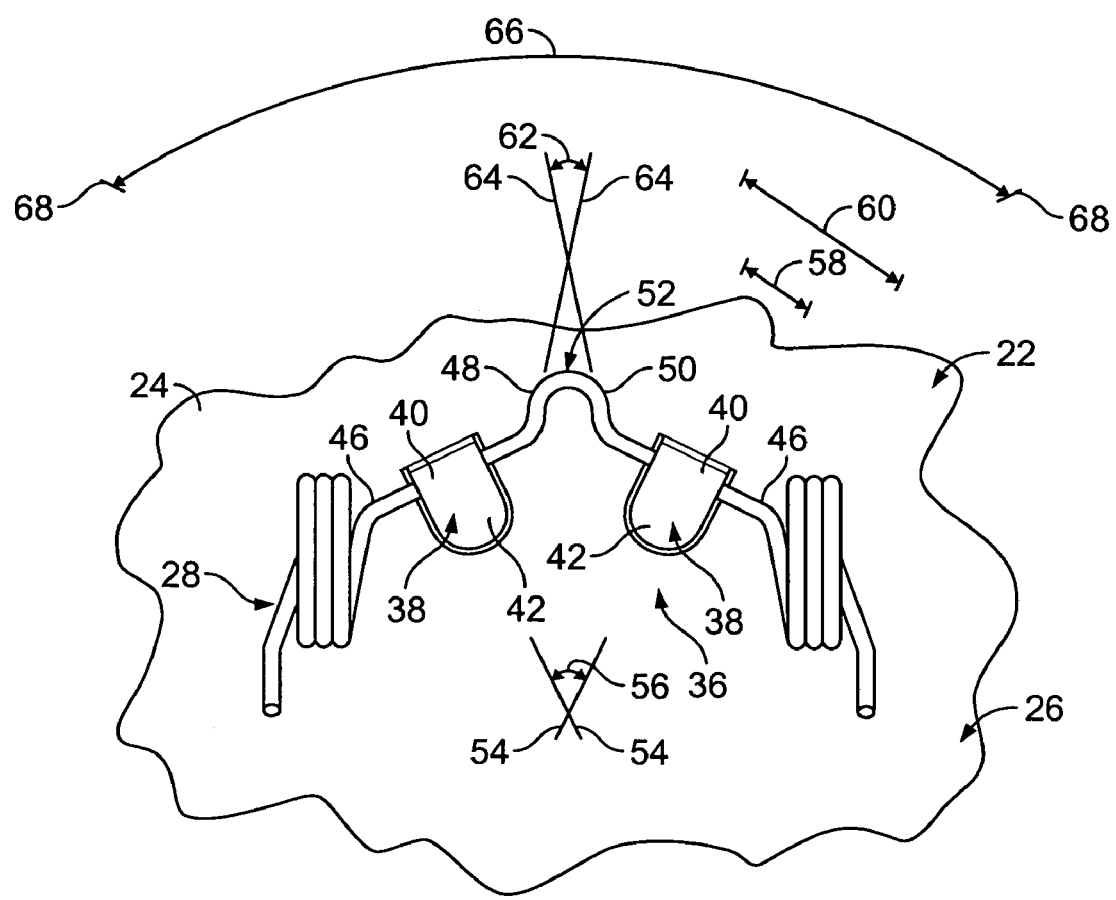
FIG. 3 illustrates a detailed top plan view of one tine mounting arrangement.

FIG. 3 illustrates a detailed bottom plan view of a tine mounting arrangement of the de-thatcher 20. In this embodiment, the tine shield 22 includes a mounting portion 24 having a mounting surface 26 and a mounting portion 24 includes a plurality of tine mounting assemblies 36 formed therein. Each tine mounting assembly 36 includes a pair of separately formed tabs 38. Each tab 38 includes a projecting portion 40 as may be best shown in FIGS. 4A and 4B, extending from the mounting portion 24 and a covering portion 42 extending from the projection portion 40. The covering portion 42 is disposed at a distance from the mounting surface 26 such that a pocket is thereby defined, (as may be seen in FIGS. 4A and 4B).

The tine 28 is operatively coupled to the tine mounting assembly 36. Each tine 28 includes a pair of arms 46 extending from opposite sides 48, 50 of a backbone 52 so that each arm 46 engages one of the pockets (as maybe seen in FIG. 4B) and are secured therein when the covering portion 42 of the tabs 38 is moved from a first operative position to a second operative position. The operative position of the covering portion 42 orients the covering portion 42 parallel to the mounting surface 26 as may be seen in FIG. 4A. The second operative position of the covering portion 40, orients the covering portion 40 oblique to the mounting surface 26, as may be seen in FIG. 4B. Means for effecting movement of the covering portion 42 from the first operative position to the second operative position will be discussed in more detail below.

Each tab 38 has a longitudinal axis 54 such that an acute angle 56 is defined between each pair of tabs 38. Each tab 38 also has a with extent 58 that is substantially less than a longitudinal extent 60 of the respective arm 46. Preferably, the tabs 38 are formed at spaced locations.

In one embodiment, a first included angle 62 is defined between longitudinal axes 64 of the opposing sides 48, 50 of the backbone 52 and a second included angle 66 is defined between longitudinal axes 68 of the arms 46 such that the first included angle 62 is more acute than the second included angle 66.

Figure 4A:
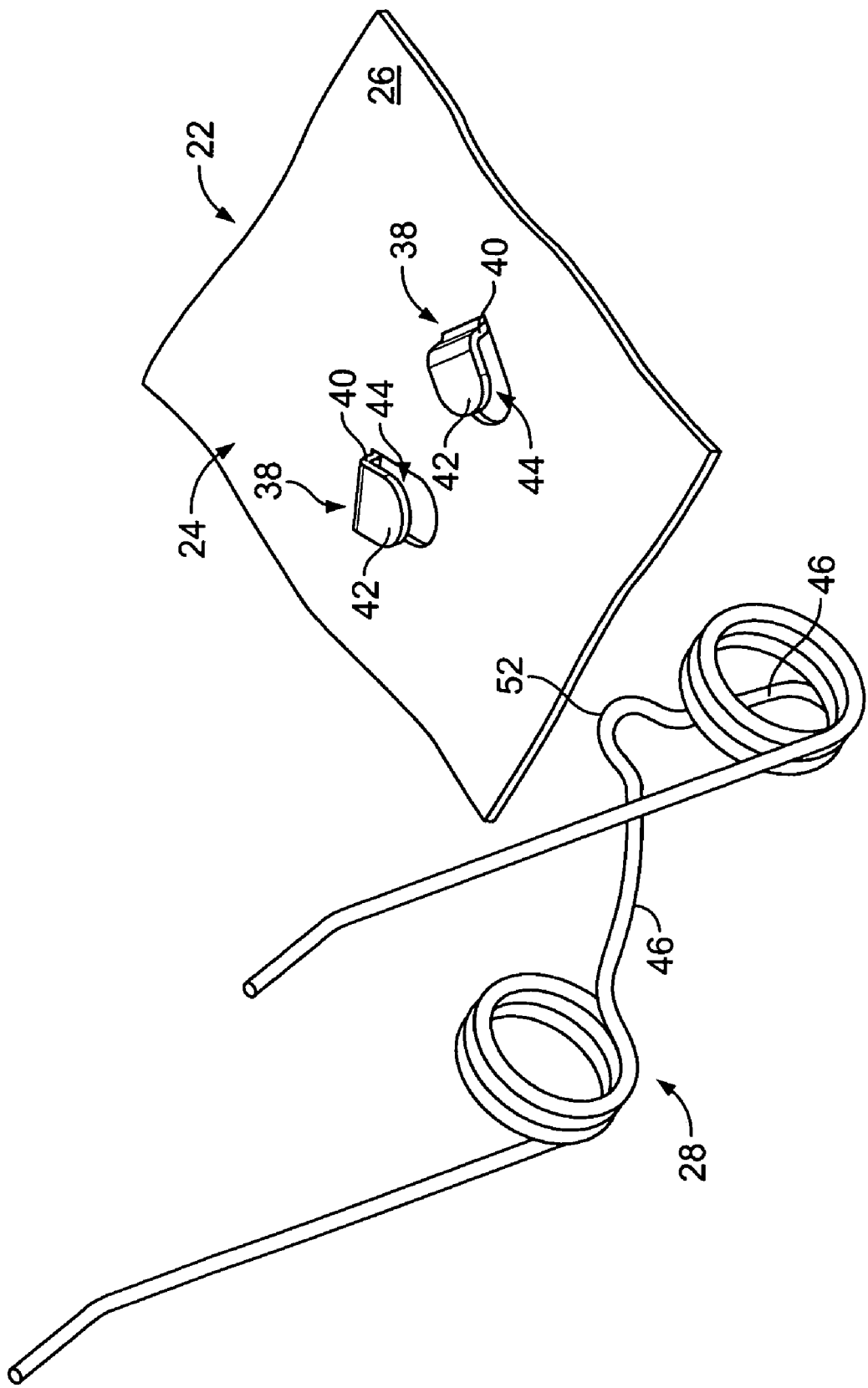
FIG. 4A illustrates a detailed exploded view of the tine mounting arrangement of FIG. 3.
Figure 4B:
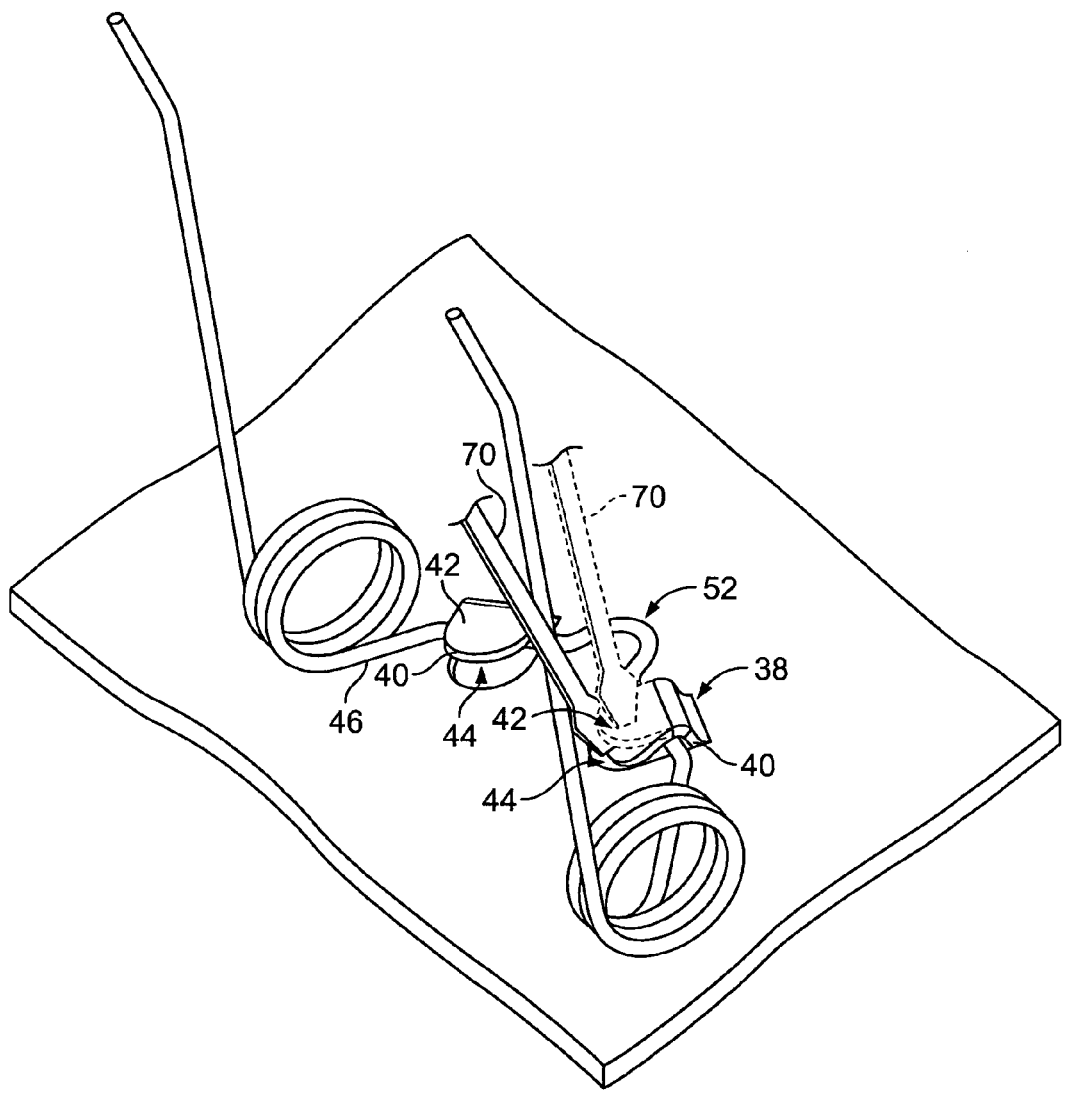
FIG. 4B illustrates a detailed perspective view of the tine mounting arrangement of FIG. 4A near completion.

FIGS. 4A and 4B illustrate a detailed exploded view and a detailed installed view of a tine mounting arrangement. FIG. 4A shows the tabs 38 disposed in the first operative position where the covering portion 42 is oriented parallel to the mounting surface 26. The pocket 44 is clearly defined between the mounting surface 26 and the lower surface of the covering portion 42. The tabs 38 are formed at spaced locations so as to each engage only one of the arms 46 of the tine 28. The backbone 52 is configured to be disposed between the tabs 38.

FIG. 4B shows the tine insulation nearly complete. One tab 38 has been moved from the first operative position to the second operative position. The other tab 38 is shown about to be engaged by a tool 70 which will facilitate movement of the covering portion 42 from the first operative position to the second operative position. It is in the teachings of the present disclosure that the tool may be any suitable implement of sufficient rigidity to facilitate moving or bending of the covering portion 42. For example, the tool may be a screwdriver, awl, pribar, chisel or any other suitable implement. FIG. 4B further shows, in phantom, movement of the tool 70 and corresponding movement of the covering portion 42. It will be recognized by those of skill in the art that upon completion of the installation the tine 28 will be securely mounted to the mounting portion 24 of the tine shield 22.

Figure 5:
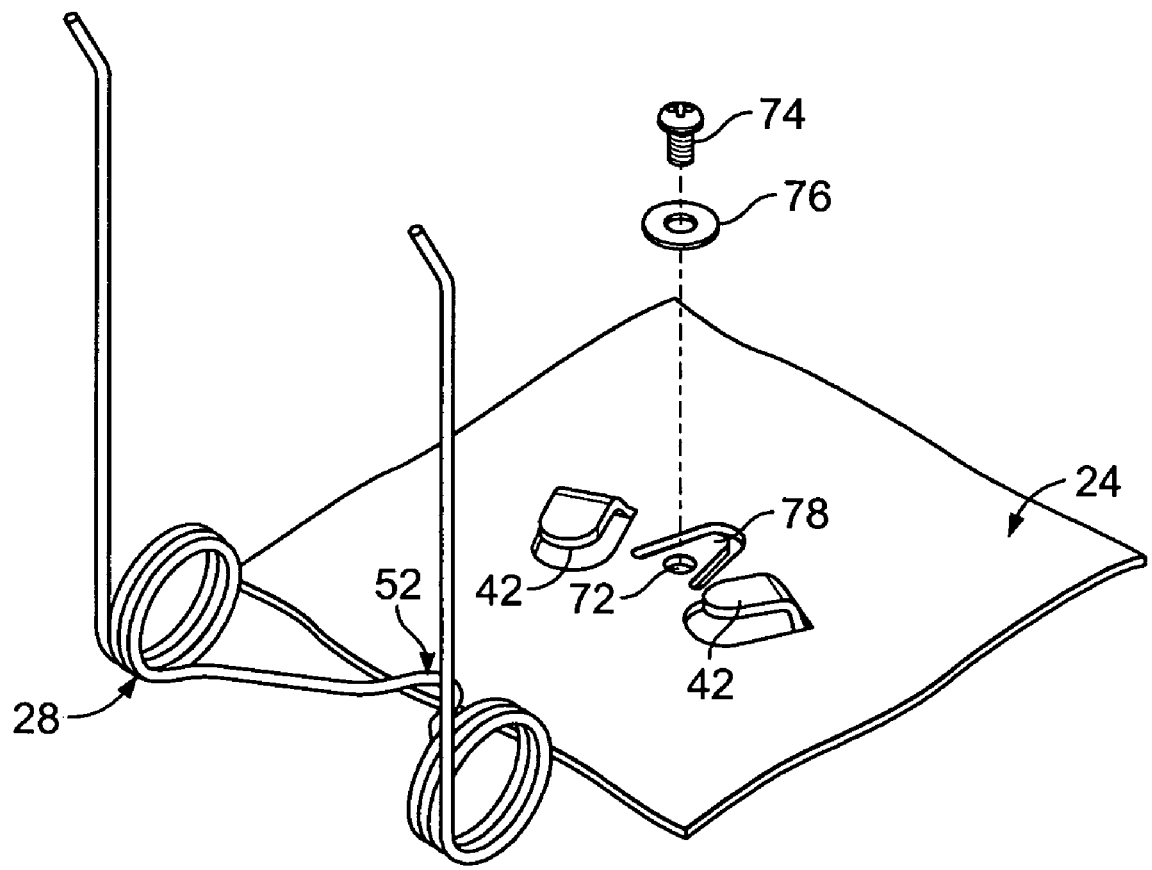
FIG. 5 illustrates an alternative embodiment of a tine mounting arrangement.

FIG. 5 illustrates an alternative embodiment wherein an aperture 72 is formed centrally disposed between the pair of tabs 38 for engaging a fastener 74 to further secure the backbone 52. Preferably, a washer 76 may be provided to facilitate enhanced engagement with the backbone 52. In a further embodiment, the aperture 72 may be disposed on a movable finger 78 defined in the mounting portion 24 that is deflectable from a coplanar orientation, as shown in FIG. 5, with the mounting portion 24 such that in the event of loss of the fastener 74 and/or loosening of the covering portions 42 away from the second operative position, such finger 78 may retain the tine 28 secured to the mounting portion 24.

Furthermore, while the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A de-thatcher comprising:
    (a) a tine shield including a mounting portion having a mounting surface;
    (b) the mounting portion including a plurality of tine mounting assemblies formed therein;
    (c) each tine mounting assembly including a pair of separately formed tabs;
    (d) each tab includes a projecting portion extending from the mounting portion and a covering portion extending from the projecting portion, thereby defining a pocket; and
    (e) a plurality of tines, each tine operatively coupled to one of the tine mounting assemblies, wherein each tine includes a pair of arms extending from opposite sides of a backbone so that each arm engages one of the pockets and are secured therein when the covering portion of tabs is moved from a first operative position to a second operative position.

2. The de-thatcher as recited in claim 1, wherein an aperture is centrally disposed between the pair of tabs for engaging a fastener for securing the backbone.

3. The de-thatcher as recited in claim 1, wherein each tab has a longitudinal axis such that an acute angle is defined between each pair of tabs.

4. The de-thatcher as recited in claim 1, wherein each tab has a width extent that is substantially less than a longitudinal extent of the respective arm.

5. The de-thatcher as recited in claim 1, wherein the first operative position of the covering portion orients the covering portion parallel to the mounting surface.

6. The de-thatcher as recited in claim 1, wherein the second operative position of the covering portion orients the covering portion oblique to the mounting surface.

7. The de-thatcher as recited in claim 1, wherein the tabs are formed at spaced locations.

8. The de-thatcher as recited in claim 1, wherein a first included angle is defined between longitudinal axes of the opposing sides of the backbone and a second included angle is defined between longitudinal axes of the arms, such that the first included angle is more acute than the second included angle.

9. The de-thatcher as recited in claim 2, wherein the aperture is disposed on a movable finger defined in the mounting portion that is deflectable from a coplanar orientation with the mounting portion.

* * * * *